United States Patent
Cirincione et al.

(10) Patent No.: US 6,634,187 B1
(45) Date of Patent: Oct. 21, 2003

(54) APPARATUS FOR DELIVERING A CASED GLASS STREAM HAVING A RAISED AND SEALED ORIFICE BUSHING

(75) Inventors: Ronald A. Cirincione, Sylvania, OH (US); Garrett L. Scott, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 331 days.

(21) Appl. No.: 09/713,430

(22) Filed: Nov. 15, 2000

(51) Int. Cl.[7] .............................................. C03B 7/088
(52) U.S. Cl. .................... 65/145; 65/325; 65/374.11; 65/374.12
(58) Field of Search ................... 65/145, 325, 374.11, 65/374.12

(56) References Cited

U.S. PATENT DOCUMENTS

| 1,603,160 A | | 10/1926 | Soubier | |
|---|---|---|---|---|
| 1,608,967 A | | 11/1926 | Tucker et al. | |
| 2,052,269 A | * | 8/1936 | Woods | 65/145 |
| 2,198,742 A | * | 4/1940 | Salskov-Iverson | 65/132 |
| 3,580,976 A | * | 5/1971 | le Clerc de Bussy | 373/35 |
| 4,017,294 A | * | 4/1977 | Sanford et al. | 65/326 |
| 4,600,426 A | * | 7/1986 | Schwenninger | 65/330 |
| 4,740,401 A | | 4/1988 | Barkhau et al. | |
| 4,780,122 A | * | 10/1988 | Schwenninger et al. | 65/134.2 |
| 4,950,321 A | | 8/1990 | DiFrank | |
| 5,567,218 A | * | 10/1996 | Ladirat et al. | 65/327 |
| 5,735,925 A | | 4/1998 | Scott | |
| 5,855,640 A | | 1/1999 | Scott et al. | |
| 5,868,812 A | | 2/1999 | Scott | |
| 5,900,033 A | * | 5/1999 | Gearing | 65/126 |
| 5,906,666 A | | 5/1999 | Scott et al. | |
| 6,119,484 A | * | 9/2000 | Takei et al. | 65/134.2 |

FOREIGN PATENT DOCUMENTS

EP 0413128 A1 2/1991

* cited by examiner

*Primary Examiner*—Sean Vincent

(57) ABSTRACT

Apparatus for delivering a cased glass stream having an inner core glass surrounded by an outer casing glass includes a first or upper orifice ring having at least one orifice for receiving core glass, and a second or lower orifice ring secured beneath the first orifice ring and having a second orifice aligned with each first orifice. A chamber for receiving casing glass is formed between the first and second orifice rings surrounding the second orifice. A bushing is received in an opening in the second orifice ring to form each second orifice in the second orifice ring. The bushing has a first radially extending flange supported on an upper surface of the second orifice ring and a bushing end spaced upwardly from the first flange for admitting casing glass from the chamber to the second orifice. The first flange thus effectively spaces the bushing end above the surface of the second orifice ring, eliminating any need for the ceramic pedestal that can erode due to casing glass flow along the surface of the second orifice ring. The flange remains in firm facing abutment with the second orifice ring surface, reducing leakage of casing glass between the bushing and the opposing surface of the second orifice ring.

2 Claims, 2 Drawing Sheets

APPARATUS FOR DELIVERING A CASED GLASS STREAM HAVING A RAISED AND SEALED ORIFICE BUSHING

The present invention is directed to delivery of a glass stream for forming glass charges or gobs for glassware manufacture, and more particularly to a method and apparatus for delivering a so-called cased glass stream in which an inner or core glass is surrounded by an outer or casing glass.

BACKGROUND AND SUMMARY OF THE INVENTION

It has heretofore been proposed in U.S. Pat. No. 4,740,401 to provide a cased glass stream for forming glassware having layered wall segments. U.S. Pat. Nos. 5,776,221 and 5,855,640 disclose techniques for delivering such a cased glass stream in which core glass from a first source is delivered through at least one first orifice. A second orifice is vertically spaced beneath and aligned with each first orifice, and is surrounded by a chamber that communicates with the second orifice through a gap between the first and second orifices. A heated tube delivers casing glass from a second glass source to the chamber that surrounds the second orifice. Glass flows by force of gravity through the orifices from the first and second sources in such a way that a cased glass stream emerges from the second orifice. This cased glass stream may be sheared by conventional techniques to form individual cased glass gobs for delivery to conventional individual section glassware forming machines.

Although the techniques disclosed in the noted patents address and overcome problems theretofore extant in the art, further improvements remain desirable. For example, in the systems disclosed in the noted patents, the lower orifice is formed by a metal bushing received in an opening in a ceramic lower orifice ring. The bushing has an upper flange that rests on a ceramic pedestal extending upwardly from the surface of the orifice ring, which effectively raises the flange above the surface of the ring. The flange on the bushing must be raised above the surface of the orifice ring because casing glass flows along this surface to the backside of the gap between the upper and lower orifices to form the layer around the core glass. However, it has been found that this pedestal of ceramic material erodes due to high temperature casing glass flow around the pedestal, eventually resulting in leakage of glass between the outer surface of the bushing and the surrounding ceramic material of the orifice ring. It is a general object of the present invention to provide a method and apparatus for delivering a cased glass stream in which the inlet end of the metal bushing is raised above the surface of the orifice ring to permit glass flow along the surface beneath the bushing, but which reduces erosion of the ceramic material and glass leakage between the bushing and the orifice ring opening.

Apparatus for forming a cased glass stream having an inner core glass surrounded by an outer casing glass, in accordance with one aspect of a presently preferred embodiment of the invention, includes a first or upper orifice ring having at least one orifice for receiving core glass, and a second or lower orifice ring secured beneath the first orifice ring and having a second orifice aligned with each first orifice. A chamber for receiving casing glass is formed between the first and second orifice rings surrounding the second orifice. A bushing is received in an opening in the second orifice ring to form each second orifice in the second orifice ring. The bushing has a first radially extending flange supported on an upper surface of the second orifice ring and a bushing end spaced upwardly from the first flange for admitting casing glass from the chamber to the second orifice. The first flange thus effectively spaces the bushing end above the surface of the second orifice ring, eliminating any need for the ceramic pedestal that can erode due to casing glass flow along the surface of the second orifice ring. The flange remains in firm facing abutment with the second orifice ring surface, reducing leakage of casing glass between the bushing and the opposing surface of the second orifice ring.

In the preferred embodiment of the invention, the second orifice ring is of ceramic construction, and the bushing is of metal construction. The bushing comprises a cylindrical body having the first flange secured between the ends of the body, and a second flange extending radially outwardly from an end of the bushing body spaced from the orifice ring surface. The opposing end of the bushing body extends through an opening in the orifice ring, and is secured to the orifice ring by means of a ferrule secured to the end of the bushing body. The undersurface of the orifice ring surrounding the bushing opening preferably is conically countersunk, and the ferrule has a conical surface in sliding engagement with the conically countersunk surface of the orifice ring. In this way, the ferrule remains in sealing abutment with the opposing countersunk surface of the orifice ring during thermal axial and radial expansion of the metal bushing as it is heated by flow of glass through the bushing.

In accordance with another aspect of the present invention, there is provided an orifice ring assembly for a cased glass apparatus, which includes a ceramic lower orifice ring having a pocket with a laterally extending passage for receiving casing glass, and at least one opening extending through the orifice ring from the pocket. A metal bushing is secured in each such opening. The bushing has a cylindrical body with opposed ends, a first flange extending from the bushing body between the ends in facing engagement with the opposing upper surface of the orifice ring pocket, and a second flange at one end of the bushing spaced from the pocket surface. The other end of the bushing is disposed adjacent to an undersurface of the orifice ring, and a ferrule is secured to such other end in facing abutment with the undersurface. The orifice ring undersurface preferably has a conical countersunk portion surrounding each opening, and each ferrule has a conical surface in facing abutment with the conical countersunk portion for maintaining facing abutment with the conical countersunk surface portion during thermal expansion of the bushing.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosures of U.S. Pat. Nos. 5,855,640 and 5,906,666 are incorporated herein by reference for purposes of background.

Figure 1:
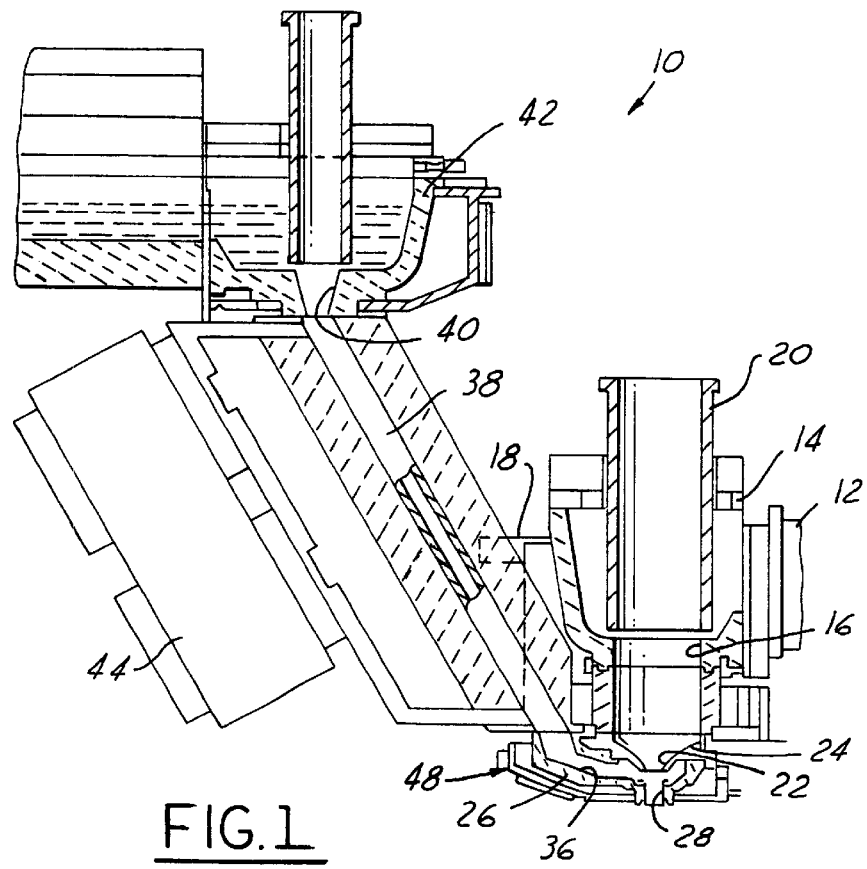
FIG. 1 is a fragmentary elevational schematic diagram of a cased glass delivery system in accordance with a presently embodiment of the invention.
Figure 2:
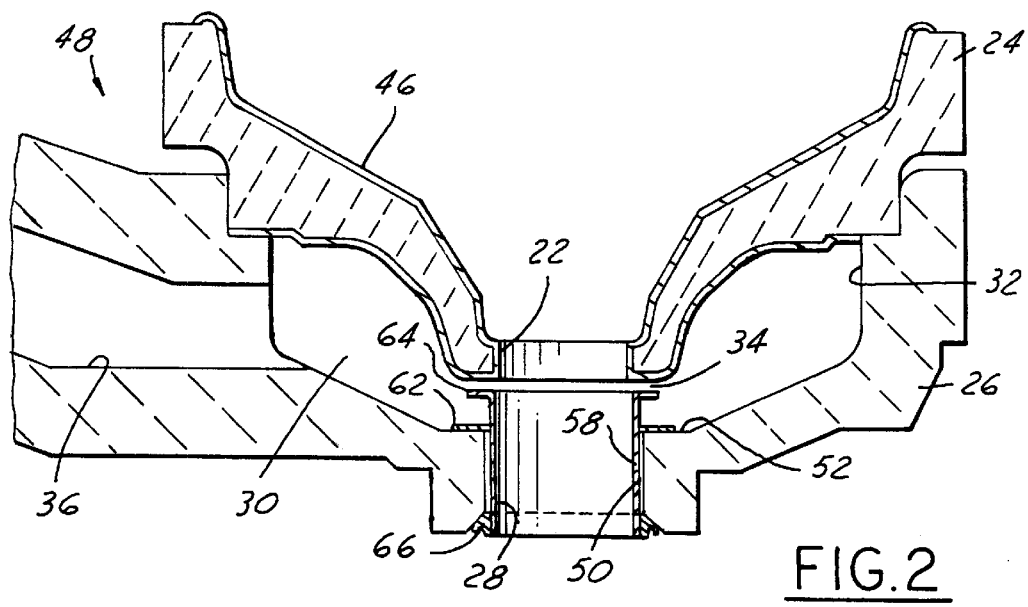
FIG. 2 is a fragmentary sectional view on an enlarged scale of the orifice rings and metering gap in the system of FIG. 1.

FIGS. 1–2 illustrate a system 10 for delivering a stream of cased glass. A first forehearth 12 delivers core glass to a spout 14 that has an opening 16 at the lower end thereof. Spout 14 is surrounded by a protective case 18, preferably constructed of non-magnetic metal such as stainless steel. A tube 20 controls delivery of core glass from spout 14 through opening 16 to and through at least one first orifice 22 carried by an upper orifice ring 24 beneath spout 14. A lower orifice ring 26 carries at least one second orifice 28 positioned beneath orifice(s) 22 and axially aligned therewith. Orifice 28 is surrounded by an annular chamber 30 formed between orifice rings 26,28 by a pocket 32 in lower orifice ring 26. Chamber 30 communicates with lower orifice 28 by means of a lateral metering space or gap 34 between orifices 22, 28. A laterally extending passage 36 in lower orifice ring 26 is coupled by a delivery tube 38 to the opening 40 at the lower end of a casing glass delivery spout 42. Delivery tube 38 is resistance-heated by control electronics 44 for maintaining flow of casing glass to chamber 30. Upper and lower orifice rings 24, 26 are of heat-resistant ceramic construction. Upper orifice ring 24 has a coating 46 of platinum or the like for preventing erosion of the ceramic material. Upper and lower orifice rings 24, 26 preferably are provided in the form of an orifice ring assembly 48.

Each orifice 28 in lower orifice ring 26 is formed by a cylindrical opening 50 (FIGS. 2–4) that extends through orifice ring 26. The upper surface 52 of orifice ring 26 surrounding each opening 50 is essentially flat, as opposed to forming a raised pedestal as in the prior art discussed above. The lower surface 54 of orifice ring 26 has a conically countersunk portion 56 surrounding each opening 50. A metal bushing 58 is secured to orifice ring 26 within each orifice opening 50. Each bushing 58 comprises a cylindrical body 60 with opposed axially spaced ends. A circumferentially continuous first flange 62 is welded or otherwise secured to the external surface of bushing body 60, projecting radially outwardly therefrom in a plane perpendicular to the axis of the bushing at a position spaced beneath the upper end of the bushing body. A circumferentially continuous second flange 64 extends radially outwardly from the upper end of bushing body 60 spaced from and parallel to flange 62, preferably by being integrally formed with the body of the bushing. Each flange 62, 64 is of uniform radial dimension around the circumference of bushing 58. A split ferrule 66 is welded or otherwise fixedly secured to the lower end of bushing body 60. Ferrule 66 has a conical surface 68 in opposed abutment with countersunk portion 56 of orifice body undersurface 54. Thus, bushing 58 is firmly clamped to orifice ring 26 by means of bushing flange 62 in opposed abutment with upper surface 52 and ferrule surface 68 in opposed abutment with countersunk surface portion 56.

Figure 3:
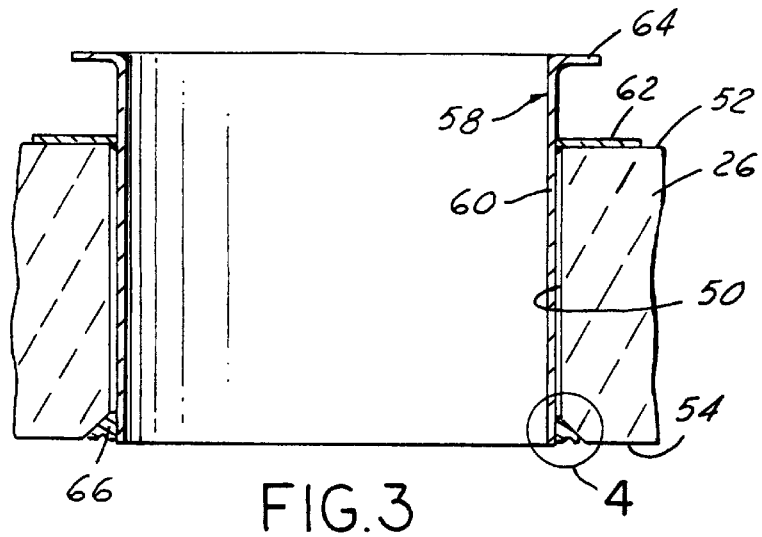
FIG. 3 is a fragmentary sectional view on an enlarged scale of the lower orifice ring and bushing assembly in the system of FIGS. 1 and 2.
Figure 4:
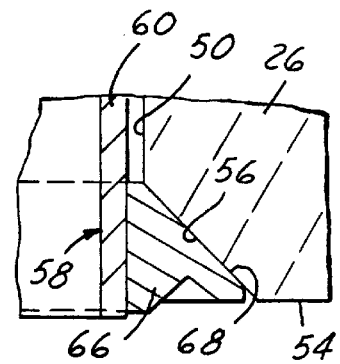
FIG. 4 is a fragmentary view on an enlarged scale of the portion of FIG. 3 within the circle 4.
Figure 5:
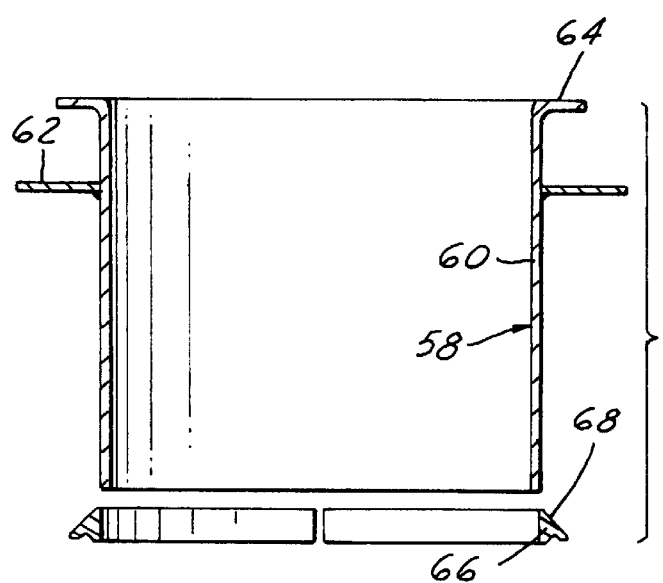
FIG. 5 is an exploded sectional view of the metal orifice ring bushing in the apparatus of FIGS. 1–4.
Figure 6:
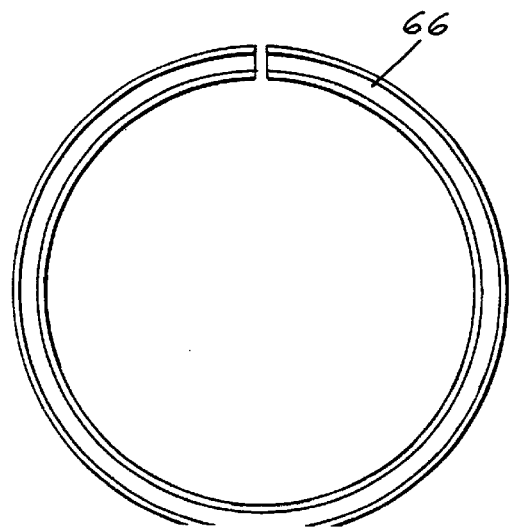
FIG. 6 is a bottom plan view of the ferrule for securing the bushing to the lower orifice ring in accordance with a presently preferred embodiment of the invention.

In assembly, lower orifice ring 26 is cast of suitable heat-resistant ceramic material, and opening(s) are formed in the orifice ring, either by casting or drilling. Flange 64 preferably is integrally formed with bushing body 60, and flange 62 is welded or otherwise secured to the body of the bushing as illustrated in FIG. 5. The lower end of bushing body 60 is then inserted through opening 50 in orifice ring 26, and split ferrule 66 is welded or otherwise secured to the lower end of the bushing body. As best seen in FIGS. 3 and 4, the outer surface of bushing body 60 is radially spaced from the opposing surface of opening 50 when the lower orifice ring assembly is cold to accommodate thermal expansion during use. The opposed conical surfaces 56, 68 at ferrule 66 accommodate axial and radial thermal expansion of bushing body 60 and ferrule 66 while maintaining opposed sliding contact between surfaces 56, 68. During use, casing glass entering chamber 30 through passage 36 is free to flow along the upper surface of pocket 32 around each bushing 28 so as to form a uniform layer of casing glass around the core glass stream. That is, core glass flows through orifice(s) 22 from forehearth 12 and spout 14, while casing glass flows from spout 42 through tube 38, passage 36, chamber 30 and gap 34 around the core glass stream, so that a cased glass stream emerges from lower orifice 28. Elimination of ceramic pedestals supporting orifice bushing 58 eliminates the problem of erosion of such pedestals and potential leakage of glass through the space between the bushing and opening 50 in lower orifice ring 26. Instead, bushing flange 62 remains in sealing contact with surface 52, greatly reducing any glass leakage.

There have thus been disclosed a method and apparatus for forming a cased glass stream that fully satisfy all of the objects and aims previously set forth. A number of modifications and variations have been disclosed. Other modifications and variations will readily suggest themselves to persons of ordinary skill in the art in view of the foregoing description. The invention is intended to embrace all such modifications and variations as fall within the spirit and broad scope of the appended claims.

What is claimed is:

1. An orifice ring assembly for an apparatus for forming a cased glass stream, comprising:

an orifice ring of ceramic construction having a pocket with a flat upper surface, a passage extending laterally from said pocket for receiving casing glass, and at least one opening extending through said ring from said flat upper surface, a metal bushing secured in said at least one opening, said bushing having a cylindrical body with opposed ends, a first flange extending from said bushing body between said ends in facing abutment with said flat upper surface and a second flange at one of said bushing ends spaced from said flat upper surface providing an unobstructed flow of glass along said flat upper surface beneath said second flange, the other end of said bushing body being disposed adjacent to an undersurface of said orifice ring, and a ferrule secured to said other bushing end in facing abutment with said undersurface and sealingly clamping said orifice ring between said ferrule and said first flange.

2. The assembly set forth in claim 1 wherein said undersurface has a conical countersunk portion surrounding said opening, and said ferrule has a conical surface in facing abutment with said conical countersunk portion for maintaining facing abutment with said conical countersunk surface portion during thermal expansion of said bushing.

* * * * *